United States Patent Office 2,948,617
Patented Aug. 9, 1960

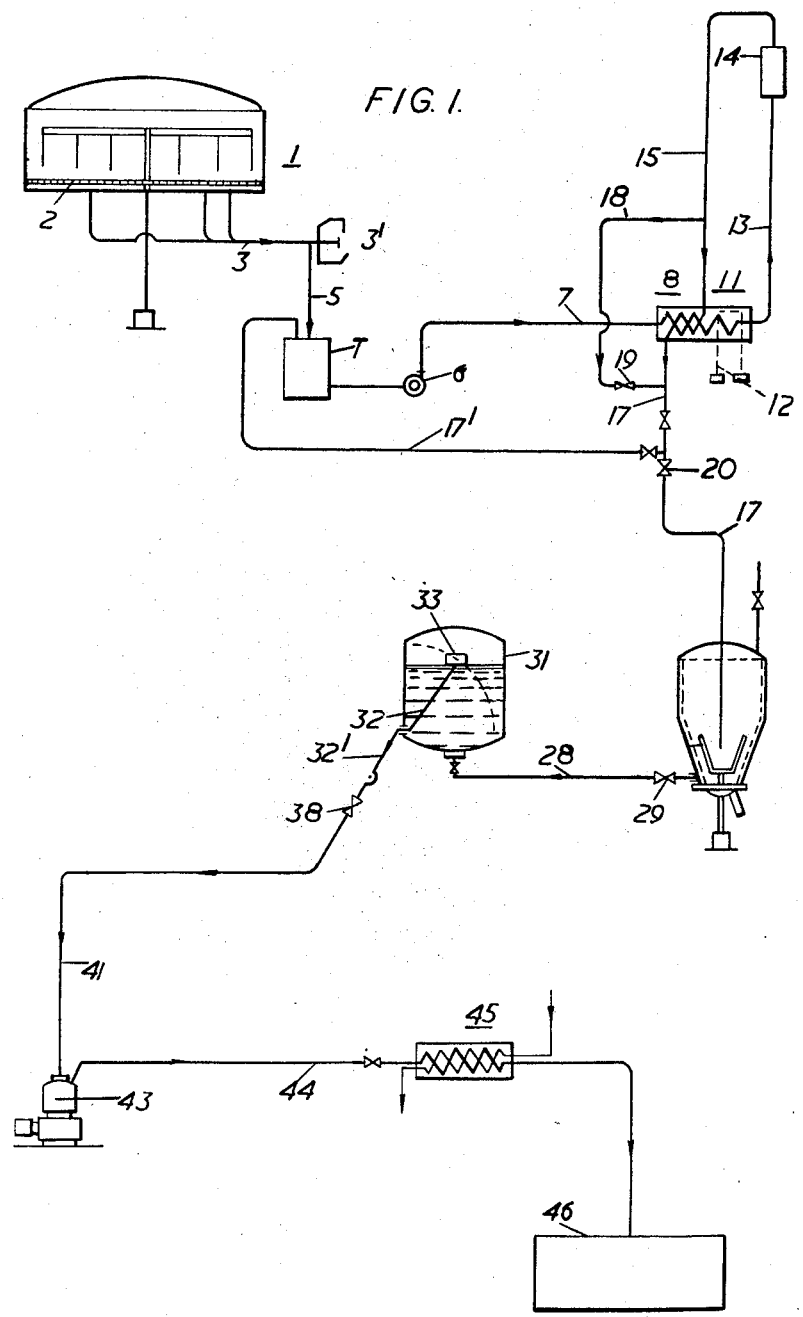

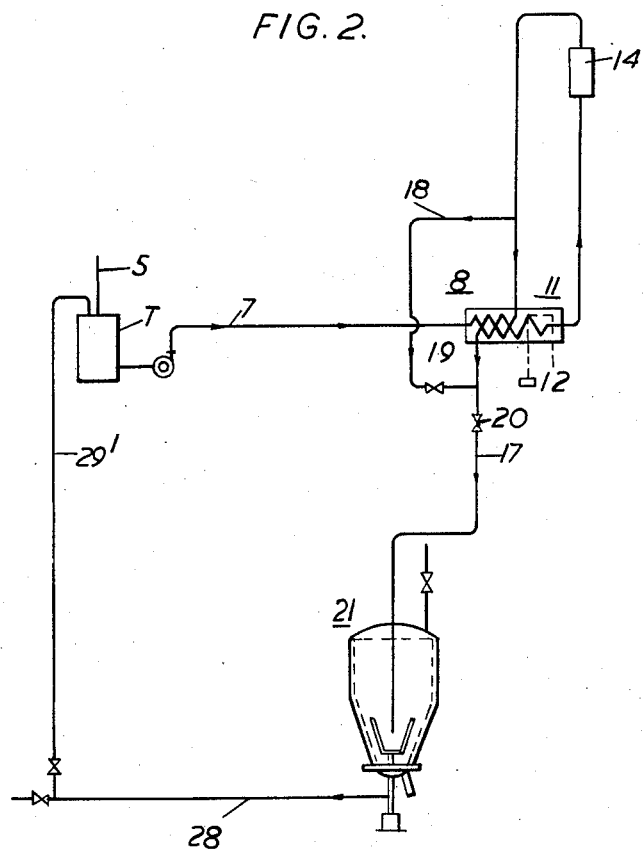

2,948,617

PROCESSING OF BREWERS' WORT

Stanley William Thomas Paine, Cuckfield, England, assignor to The A.P.V. Company Limited, Crawley, England Filed Sept. 3, 1957, Ser. No. 681,734

Claims priority, application Great Britain Sept. 7, 1956

4 Claims. (Cl. 99—52)

This invention relates to the treatment of brewer's wort.

The invention is more particularly concerned with the method which comprises passing the wort in continuous movement from a mash tun as sweet wort to a fermentation vessel as hopped wort, and in the course of that movement raising the temperature of the wort to a high value, holding the wort at the high temperature in a holding vessel, reducing the temperature of the wort and passing it to a hop extraction vessel and then passing the hopped wort to a sedimentation vessel where this is required and thence through a sludge separating device and a cooling device to the fermentation vessel.

It has now been found, and this constitutes one of the main features of this invention, that, instead of passing the wort straight through the various stages of treatment so that it is subjected only to the high temperature treatment, both the product and the operation of the plant involved in carrying out the method are improved by effecting a recirculation of the wort after it has been subjected to the high temperature treatment and reduced in temperature so that the wort is heated, cooled, and re-heated and re-cooled.

Such re-circulation can take place either while the wort is sweet (i.e. uphopped) wort which has already been raised to the high temperature and then reduced in temperature, or as a hopped wort which has already, in the sweet wort state, been raised to the high temperature then reduced in temperature and hopped.

Such a recirculation improves the condition of the wort by causing, in the case of sweet wort, additional holding time at a range of temperatures for the desirable reactions to have the required degree of completion. In the case of the hopped wort, it is found in certain cases that re-circulation may reduce harshness in flavour by subjecting the extracted hop resins to the high temperature: more particularly the transformation of hop constituents such as numulone to the desirable iso-compounds is accelerated at high temperature and also time is permitted for these reactions to go to the required degree of completion.

In either case the re-circulation is instrumental in maintaining the surfaces of the heating and cooling apparatus involved in a clean condition relatively free from deposit: this is of especial value when the heating and cooling apparatus is of the kind comprising plate type heat exchangers: such heat exchangers are very convenient and efficient for heating the wort passing to the high temperature holding vessel by heat exchange recuperation with wort discharged from the holding vessel and by heat exchange with a heating medium such as steam. By employing the principle of re-circulation, the volume of flow (for a given continuous rate of output of the system to the fermentation vessel) through the heat exchanger is increased with resulting increased velocity of flow through the heat exchanger so that deposit on the plates is inhibited.

The hopping of the sweet wort can be effected either by passing the sweet wort through hops in the most usual manner, or by injecting into the sweet wort flow a liquid hop extract.

The invention is illustrated in the accompanying drawings in which Figures 1 and 2 are diagrammatic views of an installation employing the invention.

Referring firstly to Figure 1 of the drawings, the reference 1 indicates a mash tun having a perforated base 2 to carry a charge of malt to which "liquor" is supplied, the resulting malted liquor being taken off as sweet wort by a pipe 3 to a collecting trough 3'. It should be understood that any other mashing device could be used, e.g. lauter tun, mash tun with mash filter, continuous mashing device and so on.

The sweet wort is drawn from the trough 3' through a pipe 5 to a balance tank T whence a pump 6 delivers the sweet wort through a pipe 7 to one side of a heat recuperator 8 whence the sweet wort passes through one side of an indirect heating device 11 the other side of which is supplied with a heating medium such as steam by a supply 12.

From the output of the heating device 11 the sweet wort passes, at the temperature to which it has been raised by the heating device through a pipe 13 to a vessel 14 of such capacity that the sweet wort remains in the vessel at the temperature for a predetermined period following which the wort is conveyed by a pipe 15 to the other side of the heat recuperator 8. By passing through the recuperator the sweet wort is reduced in temperature by transference of some part of its heat to the sweet wort passing in through the pipe 7 to the recuperator so effecting economy in the use of heating medium. For the purpose of controlling the temperature at which the sweet wort passes (through a pipe 17) to the next stage of treatment, a pipe 18 is branched from the pipe 15 on the upstream side of the recuperator 8, this pipe 18 by-passing the recuperator 8 and being connected to the pipe 17 through a control valve 19; the control valve 19 can be operated to regulate the volume of the by-pass flow and therefore the temperature of the wort passing to the pipe 17 by variation of the ratio of wort cooled by flow through the recuperator to high temperature wort which by-passes the recuperator and so is not cooled by heat transfer.

The total flow of sweet wort passes from the high temperature stage through the pipe 17 at a rate governed by a control valve 20. This pipe conveys the thus far treated sweet worts to a hop extraction vessel indicated generally at 21. This vessel is of any customary form.

The hopped wort can be delivered to a rest vessel 31 having for instance a swivel discharge pipe 32, the upper intake end of which is maintained by a float 33 at the upper level of the wort in the vessel and hence clear of the sediment, the pipe 32 connecting with a flow pipe 32' through which the wort flows to a sludge separator 43, which may be of any usual form such as a centrifuge, or a filter, whence the now clarified wort passes through a pipe 44 to a cooling device 45, which may be of any known type but preferably a plate heat exchanger, and thence to a fermentation vessel 46.

Now to effect re-circulation of the sweet wort to obtain the benefits referred to a pipe line 17' is branched from the pipe line 17 (through which the sweet wort passes after high temperature treatment to the hop extraction vessel 21) back to a balance tank T in the input line 7 for sweet wort passing on to high temperature treatment.

In Figure 2 is shown a part of the installation with a modification which enables part of the wort, which has been subjected to high temperature treatment, to reduction in temperature, and has been hopped, to be re-circulated: in this case, a line 29' is branched from the output line 28 from the hop extraction vessel 21 and is connected via the tank T to the input line 7 extending to the high temperature stage. It should be understood that the hop extractor can be fitted at any point desired in the circuit between balance tank T and pipe 28 thus permitting hop extraction at higher temperatures if required.

Carrageen moss or similar material can be added to the flow of wort conveniently in the balance tank T: it has been found that this addition promotes the formation of flocculum and tends to reduce the formation of solids which have an adhering nature and tend to clog the plant.

While in general the hop extraction would be effected as described beyond the recirculation part of an installation, the hop extraction could be effected within the recirculation system either before or after the holding stage in the vessel 14.

Provision could be made for the injection of air at any stage in the process to give controlled oxidation reactions in it. Normally the injection would be at the inlet to the heat exchanger 8, or the hop extractor 21.

As an example of the operating conditions of the installation shown in Figures 1 and 2 for a case where the re-circulated wort equals in volume the incoming wort, the sweet wort at 155° F. is fed from the mash tun 2 to the balance tank T to which also is taken recirculating sweet wort at 220° F. passing from the regenerative section 8 of the heat exchanger: the admixed sweet wort at about 185–190° F. after passing through the regenerator section 8 and the heating section 11 passes at a temperature of 265° F. to the holding vessel 14. The sweet wort is discharged at 265° F. from the holding vessel 14 and is reduced in the regenerative section 8 to 220° F. after which the flow is divided to pass in part in re-circulation to the tank T and in part to the hop extraction vessel operating at 220° F.

I claim:

1. In the treatment of brewer's wort by the method which includes passing the wort in continuous movement through stages to convert the wort from sweet wort into hopped wort which is passed to a fermentation stage, the wort being subjected, at one stage prior to the fermentation stage to a high temperature treatment and a subsequent cooling treatment, the step which consists in re-circulating at least part of the wort after it has been cooled so that the wort is re-raised to the high temperature and re-cooled, the wort being re-circulated after it passes to the stage in which the sweet wort is converted to hopped wort.

2. In the treatment of brewer's wort by the method which includes passing the wort in continuous movement through stages to convert the wort from sweet wort into hopped wort which is passed via a sedimentation stage to a fermentation stage, the wort being subjected, at one stage, prior to the fermentation stage to a high temperature treatment and a subsequent cooling treatment, the step which consists in recirculating at least part of the wort after it has been cooled so that the wort is re-raised to the high temperature and re-cooled the wort being re-circulated before it passes to the sedimentation stage and after it passes to the stage in which the sweet wort is converted to hopped wort.

3. In the treatment of brewer's wort in a continuous progression system by the method which includes passing the wort in continuous movement through stages to convert the wort from sweet wort into hopped wort which is passed to a fermentation stage, the wort being subjected, at one stage prior to the fermentation stage to a high temperature treatment and a subsequent cooling treatment, the step which consists in re-circulating at least part of the wort after it has been cooled so that the wort is re-raised to the high temperature and re-cooled, at least a controlled part of the wort being re-circulated after it passes to the stage in which the sweet wort is converted to hopped wort.

4. In the treatment of brewer's wort in a continuous progression system by the method which includes passing the wort in continuous movement through stages to convert the wort from sweet wort into hopped wort which is passed via a sedimentation stage to a fermentation stage, the wort being subjected, at one stage, prior to the fermentation stage to a high temperature treatment and a subsequent cooling treatment, the step which consists in recirculating at least part of the wort after it has been cooled so that the wort is re-raised to the high temperature and re-cooled, at least a controlled part of the wort being re-circulated before it passes to the sedimentation stage and after it passes to the stage in which the sweet wort is converted to hopped wort.

References Cited in the file of this patent

UNITED STATES PATENTS

| | | |
|---|---|---|
| 1,345,437 | Fehr | July 6, 1920 |
| 2,555,938 | Seligman et al. | June 5, 1951 |